United States Patent [19]

Lynn

[11] 3,973,043

[45] Aug. 3, 1976

[54] FEEDLOT ANIMAL WASTES INTO USEFUL MATERIALS

[76] Inventor: Howard D. Lynn, 221 Star, Hereford, Tex. 79045

[22] Filed: July 31, 1975

[21] Appl. No.: 600,919

[52] U.S. Cl. .................................. 426/55; 426/56; 426/807; 195/27; 47/1.4
[51] Int. Cl.² ...................................... A23K 1/00
[58] Field of Search ............... 426/55, 56, 2, 52–54, 426/807; 195/94, 33, 50, 111, 115, 109, 117, 27; 210/2, 16, 17; 71/8–10; 47/1.4

[56] References Cited
UNITED STATES PATENTS

| | | | |
|---|---|---|---|
| 2,004,706 | 6/1935 | Nuske | 71/7 |
| 2,867,945 | 1/1959 | Gotaas et al. | 210/15 X |
| 3,666,106 | 5/1972 | Green | 210/16 |
| 3,838,199 | 9/1974 | Coe et al. | 426/55 |
| 3,846,559 | 11/1974 | Stevens | 426/56 |

*Primary Examiner*—A. Louis Monacell
*Assistant Examiner*—R. B. Penland
*Attorney, Agent, or Firm*—Hubbard, Thurman, Turner & Tucker

[57] ABSTRACT

A method for converting feedlot fecal waste materials into methane and animal feed is disclosed. In the disclosed method, the feedlot fecal waste materials are collected, combined with water to form a slurry and the slurry is thereafter subjected to an anaerobic fermentation process. The anaerobic fermentation process is carried out under conditions such that a methane rich gas is formed which can be collected and utilized as an energy source. The liquid residue material from the anaerobic fermentation step is thereafter subjected to an aerobic fermentation process to produce a protein rich material that can be utilized as an animal feed. The liquid residue remaining from the aerobic fermentation process can be utilized as a fertilizer material.

17 Claims, 1 Drawing Figure

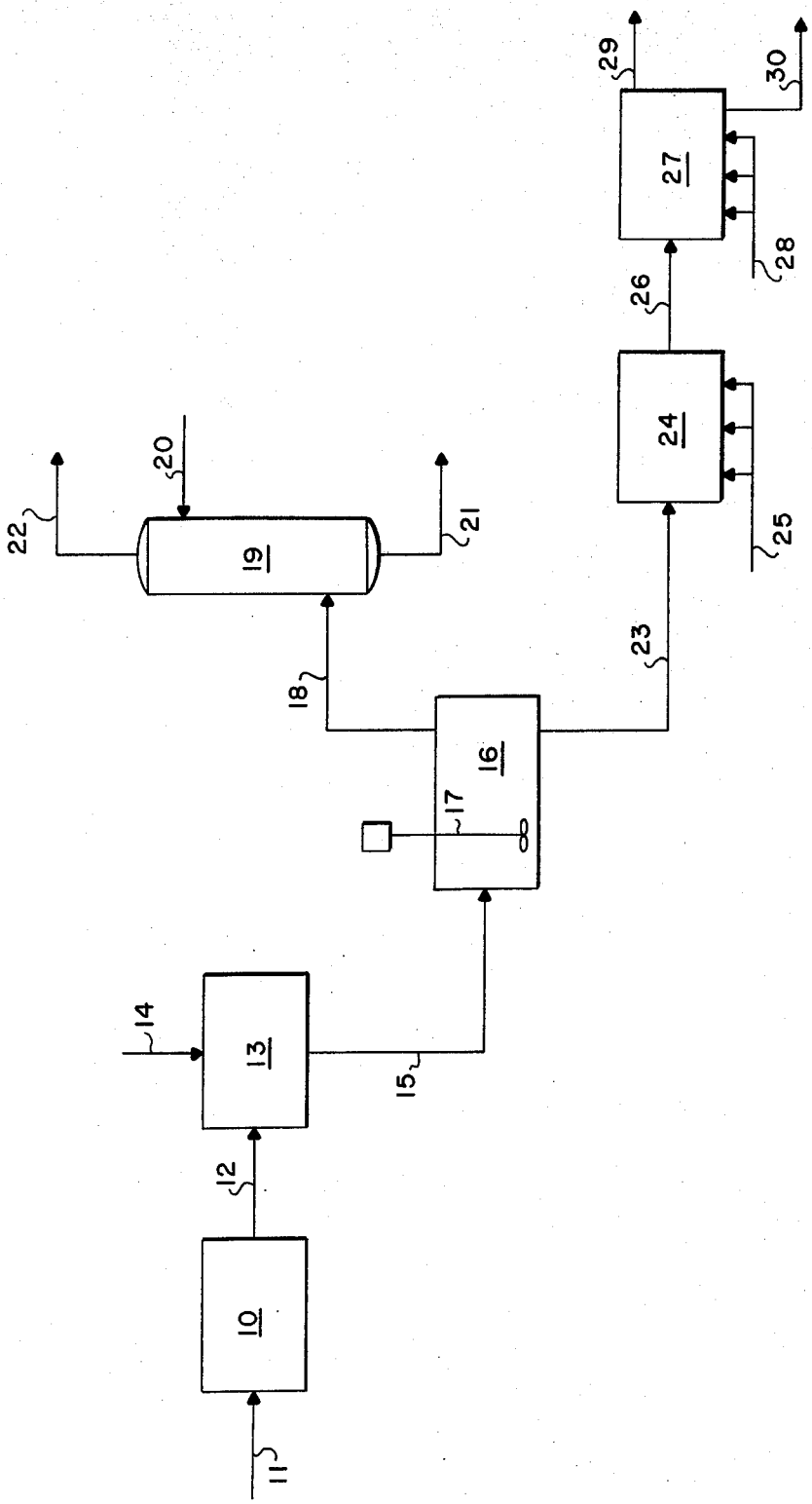

FEEDLOT ANIMAL WASTES INTO USEFUL MATERIALS

BACKGROUND OF THE INVENTION

This invention relates to a method for converting feedlot animal waste material into useful products including methane and an animal feed material. In another aspect, this invention relates to a method for subjecting feedlot waste materials to a two-stage fermentation process to produce a methane containing gas and a material that can be utilized as an animal feed. In still another aspect, this invention relates to a process wherein feedlot waste materials are subjected to an anaerobic fermentation process to produce methane and a first residue material followed by an aerobic fermentation of the first residue material to produce a protein rich material that can be used as an animal feed. In yet another aspect, this invention relates to a process wherein feedlot waste materials are subjected to an anaerobic fermentation process in the presence of added nitrogen to produce a residue material having a carbon to nitrogen ratio that is significantly lower than the feedlot waste material.

It has been estimated that there are on the order of 115 to 120 million head of beef cattle in the United States. These cattle produce vast quantities of fecal waste material.

In recent years, a new industry has developed in which beef cattle are placed in feedlots, which are rather confined areas, and the cattle are fed specialized rations to increase the body weight of the animals and improve the quality of the carcass of the animals. It has been estimated that from 10 to 20% of all beef cattle in the United States are maintained in feedlots and that the cattle so maintained in feedlots produce from 130 million to 260 million tons of dry organic fecal waste materials per year.

With the production of vast quantities of fecal waste materials by feedlot operations, it will be apparent that the economic disposal of such waste materials is a growing problem. Until very recently, the most common way of disposal of such waste materials was to simply let the waste material decompose by natural processes in the feedlot. The inaction of feedlot owners in processing fecal waste materials from feedlots has led to some rather serious problems in the area of pollution of air and water resources due to the stench of the decomposing fecal waste materials and the runoff and percolation of contaminated water from the feedlots. Additionally, serious health problems have been observed due to the attraction of insects and other pests that feed upon and multiply in the fecal waste materials.

Rather crude and elementary methods of minimizing or eliminating the problem of feedlot fecal waste material buildup have been suggested. Among these solutions is the rather obvious solution of merely hauling the fecal waste materials away and dumping it on fields to add nutrients to the soil. Additionally, composting of the fecal waste material has been undertaken on a limited scale to decompose the fecal waste material and sell it as an agricultural fertilizer component. These rather crude methods of disposing of fecal waste materials from feedlots have not met with great commercial success because of increasing transportation costs, complicated handling procedures involved in hauling and handling the materials, and almost nonexistent returns on capital investment in such processes.

Recently, two important factors have developed in the feedlot industry that affect the past methods for disposal or nondisposal of feedlot waste materials. The first factor is the increasing pressure from environmental groups and the public to develop safe and efficient methods for disposing of the feedlot waste materials to prevent air and water pollution and to minimize the health dangers posed by the accumulation of large amounts of fecal waste materials. The second important development is in the area of economics. The margins for profits in the area of feedlot operations continue to decrease because of the increased cost of feed materials and the failure of meat prices to increase at the same rate the feed prices are increasing. Thus, methods for decreasing purchased feed usage and methods for converting waste materials into useable valuable materials are very attractive to feedlot operations.

Several types of processes for converting cattle manure into more valuable products have been recently suggested. One such method has been disclosed in U.S. Pat. No. 3,838,199 wherein a process for thermophilic anaerobic fermentation of cattle manure is said to produce a feed supplement. This process has not been widely used because of the very high energy consumption involved in evaporating the broth and because the amount of material recovered from the broth for use as a feed supplement is very small. Additionally, the method disclosed in the patent is not particularly applicable for the conversion of feedlot fecal waste, especially in a continuous process.

SUMMARY OF THE INVENTION

Accordingly, it is an object of this invention to provide a new and improved process for converting feedlot fecal waste materials into more valuable products. It is another object of this invention to provide a new and improved process and converting feedlot fecal waste materials into methane and valuable animal feed materials. It is still a further object of this invention to provide a new and improved two-stage fermentation process for treating feedlot fecal waste materials to produce a methane containing gas in an anaerobic fermentation zone and to produce a high protein animal feed in an aerobic fermentation zone. It is another object of this invention to provide a new and improved process for subjecting feedlot waste materials to produce methane and a nitrogen rich material by an anaerobic fermentation process. It is yet another object of this invention to provide a continuous process for converting feedlot fecal waste materials into valuable products using a two-stage fermentation process without requiring the addition of bacterial cultures to start or support the fermentations.

Other aspects, objects and advantages of this invention will be apparent to those skilled in the art from the following disclosure and appended claims.

According to the instant invention, it has now been found that feedlot fecal waste materials can be converted into useful, more valuable materials, such as methane, fertilizer components and a protein rich animal feed. In carrying out the process of this invention, the feedlot fecal waste materials are collected and combined with water to form a slurry. The slurry will contain at least about 10 parts by weight solid material. The resulting slurry is then subjected to an anaerobic fermentation process under conditions and for a period of time to produce a methane containing gas stream and a first residue material. In one embodiment of the invention, nitrogen can be added during at least a portion of the anaerobic fermentation process to increase the nitrogen to carbon ratio of the first residue material. The methane containing gas is separated from the first residue material and the gas stream can be treated to recover methane from other gaseous components such as carbon dioxide. The resulting first residue material from the anaerobic fermentation can thereafter be used as a fertilizer material or at least a portion of it can be subjected to an anaerobic fermentation process to produce an edible animal feed and a second residue material. Following separation of the animal feed from the second residue material, the second residue material can be utilized as a valuable soil fertilizer component and the high protein animal feed can be refed to the cattle confined in the feedlot thereby improving overall use efficiency of purchased feed. The second stage aerobic fermentation process can be carried out to produce either a protein and amino acid rich bacteria product that is useful for animal feed or it can be carried out to produce a protein and amino acid rich microalgal material that is useful for animal feed. Following separation of the protein and amino acid rich animal feed component from the second stage fermentation zone effluent, the remaining residue product, usually in the form of a liquid, can be utilized as a soil fertilizer component. Both the anaerobic and aerobic fermentation processes are carried out without the addition of pure or enriched cultures to support the fermentation steps. In carrying out the anaerobic fermentation process, the methane production is maximized by maintaining the temperature at less than about 110°F. Because of the chemical composition of feedlot fecal waste materials, the atomic ratio of potassium to the sum of sodium plus calcium plus magnesium is controlled such that the potassium to sodium plus calcium plus magnesium atomic ratio is in the range of about 1.05:1 to about 1.15:1 in order to sustain the anaerobic fermentation process.

DESCRIPTION OF DRAWING

The drawing is a schematic diagram of one of the preferred embodiments of this invention. In the illustrated preferred embodiment, a two-stage continuous process for producing high quality methane gas and high quality animal feed is illustrated.

DESCRIPTION OF PREFERRED EMBODIMENTS

In the instant invention, feedlot fecal waste materials are converted into more valuable materials in a two-stage fermentation process. The term "feedlot fecal waste materials," as used through this specification means the fecal waste materials produced by "beef cattle" that are confined in feedlots and are fed on a high protein diet that includes various fast weight gain components such as salts and other minerals. Because of the rather specialized diet that beef cattle are placed on while they are confined in feedlots, the chemical composition of the fecal waste materials or the manure differs considerably from the chemical composition of range fed or grass fed beef cattle. Additionally, the chemical composition of feedlot fecal waste materials differs considerably from the composition of waste materials from other domestic animals such as pigs, horses and the like. While it is true that various prior art processes have been suggested for producing methane from cattle manure such as pigs, horses, range fed beef cattle and even from domestic sewage, such processes have not been applicable to the continuous production of methane from feedlot fecal waste materials.

I have discovered that by closely controlling the ratio of potassium to sodium plus calcium plus magnesium and by closely controlling temperature, residence time and other conditions, large amounts of high-grade methane can be produced from feedlot fecal waste materials in an anaerobic fermentation process. The anaerobic fermentation process can be carried out without the addition of cultures to start or sustain the production of methane. Probably the lack of success in the prior art of producing large quantities of high-grade methane from feedlot fecal waste materials is due to the fact that the prior art does not recognize the criticality of controlling the potassium to sodium and calcium and magnesium ratio within the anaerobic fermentation zone nor the criticality in controlling pH, temperature and residence time within the anaerobic fermentation zone.

While several very broad suggestions have been made in the prior art of fermenting cattle manure to produce methane, these broad disclosures have been directed to "cattle manure" and such processes have been relatively ineffective for the continuous production of high quality methane from feedlot fecal waste materials without the almost constant addition of cultures to produce methane.

In carrying out the process of my invention, feedlot fecal waste materials are collected and passed to a central processing point where they can be ground, if necessary, and combined with water to form a slurry. It has been found that the chemical composition of feedlot fecal waste materials varies according to the diet the beef cattle are fed and according to the length of time the fecal waste materials have been exposed to the atmosphere as well as the weather conditions that the fecal waste materials have been exposed to. The following table sets forth the representative chemical analysis of feedlot waste materials collected from a large number of commercial feedlots:

|  | Range Weight % | Average Weight % |
|---|---|---|
| Nitrogen | 1.16 – 1.96 | 1.34 |
| Phosphorus | .32 – .85 | .53 |
| Potassium | .75 – 2.35 | 1.50 |
| Sodium | .29 – 1.43 | .74 |
| Calcium | .5 – 1.75 | 1.13 |
| Magnesium | .11 – .66 | .39 |
| Iron | .09 – .55 | .21 |
| Zinc | .005 – .012 | .009 |
| Water | 20.9 – 54.5 | 34.5 |

The various process steps of my invention can best be described by referring to the drawing which illustrates one of the preferred embodiments of my invention. In the drawing, a continuous process for converting feedlot fecal waste materials into methane and an animal feed is described. In the drawing, feedlot fecal waste material is collected and passed to grinder 10 by means of collection conveyor 11. The particle size of the fecal waste material is reduced to aid in the formation of a slurry which will thereafter be fermented as hereinafter described. It has been found that the grinder aids in the formation of the slurry especially when the feedlot fecal waste material is in a dried cake-like form. Any conventional grinder or other particle size reducing equipment can be utilized to reduce the size of the fecal waste material. The thus ground fecal waste material is passed by means of transfer conveyor 12 to slurry tank 13 wherein the ground fecal waste material is mixed with water which is added to slurry tank 13 by means of water conduit 14. A suitable means of agitation can be disposed in slurry tank 13 to aid in the formation of the slurry. Generally, it is preferred that the slurry contain at least about 10% by weight solid material. The upper limit for the amount of solids in the slurry is not particularly important, so long as the slurry can be easily transferred by means of pumping, etc., through various conduits.

Since the anaerobic fermentation zone is operated within certain preferred temperature ranges, it may be desirable to adjust the temperature of the slurry to a temperature very close to that of the anaerobic fermentation zone by adding either hot or cold water to form the slurry. However, it is not desired to add water at a temperature such that it will kill bacteria or other micro-organisms indigenous to the feedlot fecal waste material since the process of this invention utilizes such indigenous bacteria and micro-organisms to support the two-stage fermentation process. Therefore, if it is needed to heat the slurry material to raise it to a temperature approaching that of the anaerobic fermentation zone, heating coils may be installed within slurry tank 13. Suitable rotors, paddles or other agitation devices may be utilized to aid in the formation of the slurry. In some instances, especially in large slurry tanks, sedementation of heavy materials such as sand, soil, rocks, and the like may occur in slurry tank 13. In such instances, such heavy material can be periodically withdrawn from the slurry tank. Since the drawing illustrates a continuous process, it may be desirable to provide for storage hoppers or bins to store either the raw fecal waste materials, the ground waste materials or the slurry to insure a constant uninterrupted supply of such components for continuous operation.

Following the formation of the slurry, the slurry is transferred by means of slurry conduit 15 into anaerobic fermentation zone 16. If desired, anaerobic fermentation zone 16 may be equipped with suitable agitation means such as stirrer 17 to stir or agitate the slurry while it is undergoing the anaerobic fermentation. The conditions and residence times utilized in the anaerobic fermentation zone will be described in more detail hereinafter.

It is important that air be excluded from anaerobic fermentation zone 16 because oxygen is detrimental to the organisms that form methane within the zone and even small amounts of oxygen will materially reduce the amount of methane produced in anaerobic fermentation zone 16. Therefore, it is desirable that anaerobic fermentation zone 16 be constructed of such materials and in such a manner as to totally exclude oxygen. By using a dipleg arrangement, fresh slurry entering anaerobic fermentation zone 16 can be added at a point below the surface of the liquid material in fermentation zone 16 to minimize oxygen entry into the anaerobic fermentor. As the anaerobic fermentation process is carried out, a vapor product is given off that is removed from anaerobic fermentation zone 16 by means of vapor removal conduit 18. It has been found that vapor comprises about 70% methane and 30% carbon dioxide on a dry basis. While the vapor can be burned without additional processing, it is usually desired to remove at least a portion of the carbon dioxide therefrom to improve the quality of the methane, especially when it is to be used as a fuel gas.

One preferred method for improving the quality of the vapor passing through vapor conduit 18 is a scrubbing technique wherein the vapor is passed to scrubber 19 and contacted with a lean scrub fluid such as water or lime water to remove the carbon dioxide therefrom. As the scrub fluid contacts the vapor containing carbon dioxide in scrubber 19 by countercurrent flow, carbon dioxide is removed from the vapor and the scrub fluid, rich in carbon dioxide, is removed from scrubber 19 by means of rich scrub fluid conduit 21. The resulting fortified methane stream can be withdrawn from scrubber 19 by means of methane product conduit 22.

The high quality methane stream removed through methane product conduit 22 can then be utilized in any desired fashion. Because of the high quality of the methane, it can be very conveniently dried and compressed and added to fuel gas systems. A portion of the methane gas can also be utilized to fire a boiler to heat a heating fluid that is quite useful in regulating the temperature of the slurry within slurry tank 13 and the material being subjected to fermentation in both the anaerobic and aerobic fermentation zones. In such instances, coils can be disposed within slurry tank 13 and the fermentation zones to receive the heating fluid thereby regulating the temperature within these zones. Additionally, the methane product can be utilized to generate steam or electrical power to power necessary mechanical equipment used in the process such as pumps, conveyors, compressors, stirrers, grinders and the like.

It will be appreciated that the overall system illustrated in the drawing can be operated without the requirement for external energy sources to power necessary mechanical and heating equipment.

Anaerobic fermentation zone 16 should be constructed of suitable material to withstand the corrosive effect of the slurry as it is being subjected to fermentation. Any suitable material such as steel, concrete, plastic lined pits and the like can be utilized to construct anaerobic fermentation zone 16. It is highly desirable to have a vapor space above anaerobic fermentation zone 16 whereby the methane rich vapor can be collected and withdrawn from the system. Normally, anaerobic zone 16 will be maintained at a pressure at least slightly above atmospheric pressure to minimize the amount of oxygen that enters the system by means of air leaks. The action of the methane producing bacteria in the anaerobic fermentation zone causes a decomposition of organic materials to produce large amounts of methane and carbon dioxide. As a result of the production of methane and carbon dioxide, the ratio of carbon to nitrogen in the residue in the anaerobic fermentor decreases from about 25:1 in the fresh feed, to a significantly lower level. Additionally, nitrogen fixing bacteria are also present and active in the anaerobic fermentation mass to further decrease the carbon to nitrogen ratio by virtue of fixing any gaseous nitrogen that may be introduced into the anaerobic fermentation zone. Thus, if nitrogen gas is bubbled through the anaerobic fermentation mass, the carbon to nitrogen ratio can be lowered even more. If nitrogen is added to the anaerobic fermentor, it may be desirable to carry out the anaerobic fermentation process in two separate vessels where the first vessel is used primarily for methane production and recovery with the effluent from the first anaerobic vessel being passed to a second anaerobic fermentation vessel where nitrogen is sparged into the fermentation mass and the nitrogen fixing bacteria will cause significant amounts of the nitrogen to be fixed. The resulting nitrogen rich residue can be used as a fertilizer as hereinafter described. The nitrogen rich residue will contain a large amount of nitrogen fixing organisms that make it particularly desirable for use as a soil fertilizer component containing beneficial active nitrogen organisms. Additionally, because of the lower carbon to nitrogen ratio of this residue material, subsequent aerobic fermentation will produce very high yields of amino acids and protein.

It has been found that under normal operations, about 20% by weight of the solid material added in the form of the slurry will be converted into vapor and withdrawn from anaerobic fermentation zone 16 each day. Therefore, the residence time within anaerobic fermentation zone 16, when it is conducted in a continuous mode, should be about 5 days.

It has been found that anaerobic fermentation zone converts essentially all of the slurry into a liquid residue material and the vapor that is withdrawn from the zone. Of course, certain sedimentation will be noticed in anaerobic fermentation zone 16 by virtue of the entry of sand, soil and other insoluble materials with the initial feedlot fecal waste materials. Therefore, it will be desired in some instances to periodically remove these sedimentary deposits from anaerobic fermentation zone 16.

The liquid residue material from anaerobic fermentation zone 16 is removed by means of anaerobic fermenter residue conduit 23 and passed to an aerobic fermentation zone 24. Aerobic fermentation zone 24 is utilized to grow either algae or bacteria and the algae or bacteria, which will be rich in protein and amino acids, which can be recovered from aerobic fermentation zone 24 for use as animal feed.

If it is desired to grow algae in aerobic fermenter 24, it has been found that sunlight greatly increases the growth of the algae. It has also been found that algae growth will take place to some extent in the dark but large amounts of carbon dioxide are needed to inject into the liquid as the algae grows. The injection of carbon dioxide into the liquid even in the presence of sunlight will also stimulate the growth of the algae. In such instances where algae is being grown in aerobic fermenter 24, carbon dioxide can be sparged into the zone through carbon dioxide sparge conduit 25. This conduit will evenly distribute carbon dioxide over a large area of liquid contained within aerobic fermentation zone 24, thus stimulating the growth of algae.

Since algae growth is stimulated by the addition of carbon dioxide, at least a portion of the vapor product from anaerobic fermentation zone 16 can be bubbled through aerobic fermentation zone 24 to supply carbon dioxide. In another aspect, it may be desirable to burn at least a portion of the methane rich vapor produced in anaerobic fermentation zone 16 to convert it to carbon dioxide which can be added to aerobic fermentation zone 24 through carbon dioxide sparge conduit 25. It is also desirable in some instances to add the rich carbon dioxide scrub liquid from scrub fluid conduit 21 to aerobic fermentation zone 24, especially when the scrub fluid is water.

In those instances where algae is grown in aerobic fermentation zone 24, it is desirable to have the aerobic fermentation zone constructed such that it is relatively shallow with an open top to allow large amounts of sunlight to penetrate the liquid mixture being used to grow the algae in.

When bacteria is grown instead of algae in aerobic fermentation zone 24, it is not particularly advantageous to provide a source of sunlight. Likewise, it is not necessary to provide for the injection of carbon dioxide into aerobic fermentation zone 24 when bacteria is being grown. Thus, in some instances, it may be desirable to grow bacteria in place of algae. It has been found that bacteria and algae both have large amounts of crude protein and quite rich in amino acids when they are harvested. It has also been found that both algae and bacteria production can be significantly increased in the aerobic fermentation zone or zones if the liquid being fermented is saturated with oxygen and if the oxygen is continuously or intermittently added to the liquid during the aerobic fermentation step. Several different methods can be utilized to add oxygen to the aerobic fermentation mass such as by stirring, sparging air into the fermentor and the like. One particularly desirable method for adding oxygen to the aerobic fermentation mass is by the use of an air lift pump that comprises an upright open ended tube with a source of air in the lower portion thereof. The action of the air rising within the tube will tend to lift liquid within the tube, resulting in a pumping motion. The air lift pump will tend to replenish the oxygen content in the aerobic fermentation mass as well as provide desired circulation of the liquid mass. Additionally, the air lift pump will aid in the dissipation of heat that is generated within the aerobic fermentation mass as the bacteria or algae are produced. The air lift pump also provides a convenient method for harvesting the mature bacteria or algae on a continuous basis by means of froth flotation within each air pump.

Normally, the size of aerobic fermentation zone 24 will be such that the effluent from anaerobic fermentation zone 16 will have a residence time of about 10 to about 14 days to allow the algae or bacteria to grow and develop to maturity. It will be appreciated that because of the long residence time required for the complete growth of the algae or the bacteria that one or more separate aerobic fermentation zones 24 may be utilized. When multiple zones are utilized, they can be in series or in parallel.

When the growth of the algae or the bacteria in the aerobic fermentation zone(s) has developed to a point where it should be harvested, the product can be harvested directly from the fermentation zone or the aerobic fermentation zone effluent can be transferred to suitable separator 27 by means of aerobic broth transfer conduit 26. When multiple aerobic fermentation zones 24 are utilized and they are connected in parallel, it is possible to harvest the desired algae or bacteria product directly from the aerobic fermentation zone by merely switching the flow of effluent from the anaerobic fermentation zone 16 into another of the aerobic fermentation zones, thus isolating the aerobic fermentation zone in which the harvest is about to take place.

It has been found that the algae and bacterial strains grow and mature in the aerobic fermentation zone at a rapid rate. Normally, the strains mature in about one day. As they mature, they lose activity and tend to settle to the bottom of the aerobic fermentation tank. If the mature algae and bacteria strains are not harvested they will die after a short period of time and will adversely affect the overall yield of the aerobic fermentation process. Therefore, it is desirable to harvest the protein and amino acid rich organisms on a daily or constant basis. As mentioned above, the use of air pumps within the aerobic fermentors provide a convenient method for harvesting the algae or bacteria by froth flotation on a continuous basis.

Several different types of harvesting are available. When algae is grown in aerobic fermentation zone 24, the algal biomass can be harvested by merely allowing the algae to settle out with a decantation of the resulting liquid residue therefrom. This method of harvesting does require long periods of time with the yields being lowered because of uneven settling and upset resulting from inadvertent agitation and the like. Filtration also suffers from similar drawbacks in that the algal biomass is quite difficult to filter. Filtering does require cleaning and replacement of filter elements at fairly rapid intervals. Centrifugation has also been suggested as a method for separating the algal biomass from the remainder of the effluent from the anaerobic fermentation zones. However, centrifugation is relatively expensive and requires a considerable amount of capital investment. Froth flotation is one of the more preferred methods for separating the algae from the liquid residue of the aerobic fermentation zone effluent. Froth flotation is well known in the art and will not be described in detail here.

When bacteria is grown in aerobic fermentation zone 24, the bacteria suspension is almost identical to an emulsion and can be separated by known de-emulsification processes. For example, electrical discharge can be used to de-emulsify the effluent from aerobic fermentation zone 24. Any other suitable method for separating the bacteria from the liquid residue can also be utilized including froth flotation. When froth flotation is utilized to separate the bacteria or algae from the liquid residue of the aerobic fermentation zone, air or other lift gas can be added to separator 27 by means of flotation gas conduit 28.

As schematically illustrated in the drawing, protein rich cattle feed is withdrawn from separator 27 by means of protein rich cattle food conduit 29. The liquid residue is withdrawn from separator 27 by means of aerobic fermenter residue conduit 30. The liquid residue so withdrawn is rich in various minerals and other nutrients thereby making it very useful as a soil fertilizer. The residue can be applied directly as a soil fertilizer or it can be dried and the solid components can be recovered from the drying step.

The protein rich cattle feed material recovered from the two step fermentation process of this invention through protein rich cattle food conduit 29 can be further processed to dry and grind it prior to feeding it to animals. However, it is not necessary to dry the recovered protein rich material prior to feeding it to animals.

It has been found that the composition of the recovered animal food is such that it contains large amounts of crude protein as well as large amounts of amino acids which are very useful as animal feeds. For example, the dry weight analysis of algae recovered from the process of this invention contains approximately 50% by weight crude protein. The bacteria recovered from the instant process has been found to contain about 40% by weight crude protein on a dry basis.

The bacteria recovered from a two-stage fermentation process according to my invention has been analyzed on several occasions and has been found to contain many different species of bacteria that are useful as animal feed. The bacteria species most predominant include the following species of bacteria: Bacillus sphaericus, Bacillus circulans, Bacillus megaterium, Staphylococcus saprophyticus, Protens mirabilis, Chromobacterium lividum, Pseudomonas fluorescens and the like. After repeated analysis of bacteria removed from the process of my invention, none of the products have been found to contain organisms of the coliform group associated with enteric diseases such as Salmonella, Shingella or Escherichia.

In carrying out the process of this invention, it is not necessary to add a culture of the methane producing bacteria to either start the first stage fermentation or to support it in continuous operation. Likewise, it is not necessary to add a culture of organisms to either start or support the growth of the bacteria or algae in the second stage fermentation zone. The feedlot fecal waste materials contain organisms that both start and support both of the fermentation processes carried out in the first and second fermentation zones. Usually, methane production can be expected in the first stage fermentation zone within 10 days from the initial charging of the slurry of fecal waste materials into the anaerobic fermentation zone. Once the fermentation process begins, the methane containing gas will be produced on a continuous basis, so long as fresh fecal waste materials are added to the anaerobic fermentation zone.

It will be appreciated that the production of methane in the first fermentation zone results from the action of bacteria on high molecular weight materials within the fermentation zone. Therefore, as the organisms act on the material within the first stage fermentation zone, a point will be reached when the organisms will eventually cease to produce carbon dioxide and methane because of the difficulty in breaking down the very small molecules in the fermentation zone. To prevent the cessation of methane production in the first fermentation zone, it is desirable to periodically add fresh fecal waste materials to support the continuous production of methane. The addition of fresh feedlot fecal waste material to the anaerobic fermentation zone can either be continuous or it can be in the form of daily additions of the material to the fermentation zone. It has been found that once the methane production begins with the anaerobic fermentation zone that approximately 20% of the weight of the feedlot fecal waste materials is converted to methane and carbon dioxide each day. Therefore, of the total capacity of the anaerobic fermentation zone, approximately 20% fresh material should be added daily.

The effluent from the anaerobic fermentation zone can either be continuously withdrawn or it can be periodically withdrawn and passed to the aerobic fermentation zone. In one simplified method of operating the two-stage fermentation process of this invention, the first liquid residue formed in the anaerobic fermentation zone can be withdrawn on a daily basis and passed to the aerobic fermentation zone.

As previously mentioned, the chemical composition of feedlot fecal waste materials is such that the potassium to sodium plus calcium plus magnesium atomic ratio must be carefully controlled to allow initiation of and continuation of the production of methane within the anaerobic fermentation zone. It has been found that the atomic ratio of potassium to the sum of the sodium plus calcium plus magnesium should be in the range of from about 1.05:1 to about 1.15:1. Since there is normally an excess of sodium, calcium and magnesium cations in feedlot fecal waste materials, potassium cations in the form of various potassium compounds can be added to the system to regulate the sodium, calcium and magnesium to potassium atomic ratio. If the potassium to sodium plus calcium plus magnesium atomic ratio does go above about 1.15:1 and methane production is decreased, the formation of methane within the anaerobic fermentation zone can be restarted by an addition of sodium, calcium or magnesium cations to restore the proper sodium plus calcium plus magnesium to potassium atomic ratio balance.

In experimental runs conducted to establish the critical range of the atomic ratio of potassium to calcium plus sodium plus magnesium, it has been found that methane productions begins at an atomic ratio of about 1.05:1 of the potassium to the sum of calcium plus sodium plus magnesium and as the ratio is increased, the methane production will continue until the ratio reaches about 1.15:1. The atomic ratios can be conveniently determined by subjecting the slurry to an analysis using conventional atomic absorption spectrophotometer equipment to determine the potassium, calcium, sodium and magnesium content, followed by well known calculations to determine the atomic ratios.

When potassium, sodium calcium or magnesium compounds are added to the anaerobic fermentation system to adjust the atomic ratios to fall within the above ranges, many compounds of these elements can be used. Such compounds include oxides, hydroxides, acetates, carbonates, bicarbonates, and the like of such elements. While the halides of such elements can be used to adjust the atomic ratios, it has been found that anions such as chlorine anions tend to retard the growth of azobacter and clostridium bacteria in the anaerobic fermentation zone. These bacteria are effective in cellulose degradation within the anaerobic fermentation zone and it is desirable to provide conditions where they will flourish and degrade the cellulose in the manure feed as much as possible. Therefore, it is preferred that compounds that will produce halogen anions, such as chlorine anions, not be added to the system.

The pH within the anaerobic fermentation zone should be maintained within the range of about 6.2 to about 7.4. Preferably, however, the pH of the anaerobic fermentation zone should be in a range of from about 6.9 to about 7.3. When it is necessary to adjust the pH of the anaerobic fermentation mass various alkaline or acid materials can be added to the system such as lime, alkaline hydroxides, organic and inorganic acids and the like. However, the pH regulating compounds should be such and in such amounts as to not adversely change the atomic ratios of sodium and calcium and magnesium to potassium as discussed above.

The temperature of the anaerobic fermentation zone is quite critical to the production of large amounts of methane. Generally, the temperature of the anaerobic fermentation zone will be from about 65°F to about 110°F. Temperatures above 110°F should be avoided since the production of methane is materially reduced when the temperature of the anaerobic fermentation zone is allowed to increase above about 110°F. The most preferred temperature range for producing methane is from about 90° to about 96°F.

It has been found that by carrying out the process of this invention within the range of the above mentioned atomic ratios and within the above mentioned pH ranges, the methane producing organisms are not nearly so sensitive to temperature changes as other types of anaerobic fermentation process such as thermophillic fermentation processes. It is known that such prior art fermentation processes must be maintained within ±1°F during a 24-hour period or the methanogenic bacteria will cease production of methane. In the present invention, however, a temperature change of 20°F can be tolerated in a 24-hour period without cessation of methane production so long as the previously stated conditions are maintained. It has been found that nitrogen fixing bacteria are present and active in the anaerobic fermentation zone and that the addition of nitrogen to the anaerobic fermentation zone results in a further decrease of the carbon to nitrogen ratio of the liquid residue from the anaerobic fermentation zone.

The aerobic fermentation zones utilized in this invention, of course, are those zones that are either open to the atmosphere or those zones wherein oxygen containing gases can be added to the fermentation zones. Probably the simplest type of aerobic fermentation zones are merely open-topped tanks or vats. If closed vessels are utilized for the aerobic fermentation zones, it is desirable to provide a means for bubbling an oxygen containing material such as air through the liquid contained within the aerobic fermentation zone as the bacteria or algae are produced. The aerobic fermentation zones can be operated at temperatures varying over a wide range of from about 65°F to about 90°F. It is preferred to maintain the aerobic fermentation zones at a temperature of from about 70° to about 85°F. It may be necessary to equip the fermentation zones with cooling or heating coils to control the temperature of the aerobic fermentation step.

The pH of the aerobic fermentation zone should be within the range of about 7 to 8. Preferably, the pH should be in a range of about 7.6 to about 7.8. It is rarely necessary to add any materials to adjust the pH of the aerobic fermentation mass. However, if pH adjustment is required, various materials such as lime, hydroxides, oxides, carbonates, and the like of alkali metals and alkaline earth elements, acids and other materials can be added.

In some instances it has been found desirable to add ferrous sulphate to the anaerobic fermentation reaction mass to reduce the toxic effects of heavy metals on the anaerobic fermentation process. Normally, not more than about three weight percent of ferrous sulphate based on the total amount of dry feedlot fecal waste materials added to the anaerobic fermentation zone will be necessary to reduce the toxic effects of any heavy metals materials that may be present in the charge to the anaerobic fermentation zone.

To attain optimum growth of bacteria in the aerobic fermentation zone, it may be desirable to add some known inorganic nutrients to the aerobic fermentation mass such as, $MgSO_4$, $7H_2O$, $KH_2PO_4$, $NaCO_3$, $Ca(NO_3)_2$, $4H_2O$, $NH_4NO_3$, $KNO_3$, $(NH_4)_2SO_4$, $H_3BO_3$, $ZnSO_4$, ferric citrate and the like.

While the foregoing specification has been directed to one of the preferred embodiments of this invention wherein a continuous process for producing methane and high protein animal feed has been described, it will be understood that the process can also be carried out in a batch mode of operation. In such batch operations, the slurry of the feedlot fecal waste materials can be fermented in an anaerobic fermentation zone for a period of time to produce methane and the resulting liquid residue can either be charged to a separate batch-type aerobic fermentation zone or the vessel can be merely opened and converted to an aerobic fermentation zone wherein the liquid residue is subjected to aerobic fermentation.

The foregoing description has been directed to a process without the addition of bacteria cultures to initiate or maintain the fermentation processes due to micro-organisms indigenous to feedlot fecal waste materials. It will be appreciated that "starter" cultures may be added to the fermentation zones to decrease the induction time during startup or to selectively produce certain desired types of algae or bacteria.

Various changes and modifications may be made in the foregoing disclosure without departing from the spirit and scope of this invention.

I claim:

1. A process for converting feedlot fecal waste materials having indigenous microorganisms contained therein into useful materials which comprises:
   a. collecting said feedlot fecal waste materials and adding water thereto to form a slurry;
   b. subjecting said slurry to an anaerobic fermentation process for a period of time to produce a methane containing gas and a first residue material;
   c. separating said methane containing gas from said first residue material;
   d. thereafter subjecting said first residue material to an aerobic fermentation to produce an edible animal feed and a second residue material; and
   e. separating said animal feed from said second residue material.

2. The process of claim 1 wherein said anaerobic fermentation process is carried out at a temperature of from about 65°F to about 110°F.

3. The process of claim 2 wherein said anaerobic fermentation process is carried out within a pH range of from about 6.2 to about 7.4.

4. The process of claim 1 wherein said aerobic fermentation is initiated by the addition of a culture of a pre-selected strain of algae or bacteria.

5. A process for converting feedlot fecal waste materials having indigenous microorganisms contained therein into useful materials which comprises:
   a. collecting said feedlot fecal waste materials and adding water thereto to form a slurry;
   b. subjecting said slurry to an anaerobic fermentation process at a temperature of from about 65°F to about 110°F, at a pH from about 6.2 to about 7.4, with the potassium to sodium plus calcium plus magnesium atomic ratio of from about 1.05:1 to about 1.15:1 and for a period of time to produce a methane containing gas and a first residue material;
   c. separating said methane containing gas from said first residue material;
   d. thereafter subjecting said first residue material to an aerobic fermentation to produce an edible animal feed and a second residue material; and
   e. separating said animal feed from said second residue material.

6. The process of claim 5 wherein said aerobic fermentation process is carried out at a temperature of about 65°F to about 90°F.

7. The process of claim 6 wherein said aerobic fermentation process is carried out at a pH of about 7 to about 8.

8. The process of claim 7 wherein said edible animal feed is substantially algae.

9. The process of claim 8 wherein said algae is separated from said second residue material by froth flotation.

10. The process of claim 8 wherein said aerobic fermentation process is carried out in the presence of added carbon dioxide.

11. The process of claim 10 wherein at least a portion of said carbon dioxide is obtained from said gas produced in said anaerobic fermentation process.

12. The process of claim 7 wherein said edible cattle feed is substantially bacteria.

13. The process of claim 12 wherein said bacteria is separated from said second residue material by froth flotation.

14. A method for treating feedlot fecal waste materials having indigenous microorganisms contained therein which comprises:
   a. collecting said feedlot fecal waste materials and adding water thereto to form a slurry; and
   b. subjecting said slurry to an anaerobic fermentation process in the presence of added nitrogen gas for a period of time to produce a material having a carbon to nitrogen ratio less than that of said feedlot fecal waste materials.

15. The process of claim 14 wherein said anaerobic fermentation process is carried out at a temperature of from about 65°F to about 110°F.

16. The process of claim 15 wherein said anaerobic fermentation process is carried out within a pH range of from about 6.2 to about 7.4.

17. A method for treating feedlot fecal waste materials having indigenous microoganisms contained therein which comprises:
   a. collecting said feedlot fecal waste materials and adding water thereto to form a slurry; and
   b. subjecting said slurry to an anaerobic fermentation process in the presence of added nitrogen at a temperature of from about 65°F to about 110°F at a pH of from about 6.2 to 7.4, with a potassium to sodium plus calcium plus magnesium atomic ratio of from about 1.05:1 to about 1.15:1 and for a period of time to produce a material having a carbon to nitrogen ratio less than that of said feedlot fecal waste materials.

* * * * *